US008512576B2

(12) United States Patent
Sarshar et al.

(10) Patent No.: US 8,512,576 B2
(45) Date of Patent: Aug. 20, 2013

(54) SYSTEM AND METHOD FOR THE PRODUCTION OR HANDLING OF HEAVY OIL

(75) Inventors: Mahmood Mir Sarshar, Beaconsfield (GB); Ali Najam Miraz Beg, Milton Keynes (GB); Carl Wordsworth, Bedford (GB)

(73) Assignee: Caltec Limited, Bedford (GB)

(*) Notice: Subject to any disclaimer, the term of this patent is extended or adjusted under 35 U.S.C. 154(b) by 1039 days.

(21) Appl. No.: 11/579,909

(22) PCT Filed: May 16, 2005

(86) PCT No.: PCT/GB2005/001940
§ 371 (c)(1),
(2), (4) Date: Sep. 21, 2007

(87) PCT Pub. No.: WO2005/111372
PCT Pub. Date: Nov. 24, 2005

(65) Prior Publication Data
US 2008/0017594 A1    Jan. 24, 2008

(30) Foreign Application Priority Data
May 17, 2004 (GB) .................................. 0410961.7

(51) Int. Cl.
*B01D 21/26* (2006.01)
*E21B 43/34* (2006.01)

(52) U.S. Cl.
USPC ........... 210/788; 210/787; 210/765; 210/804; 210/805; 210/806; 210/512.1; 210/258; 210/200; 210/207; 210/513

(58) Field of Classification Search
None
See application file for complete search history.

(56) References Cited

U.S. PATENT DOCUMENTS

| | | | |
|---|---|---|---|
| 3,837,399 A | 9/1974 | Allen et al. | |
| 4,407,367 A | 10/1983 | Kydd | |
| 4,596,586 A * | 6/1986 | Davies et al. | 95/261 |
| 4,726,420 A * | 2/1988 | Weeks | 166/68 |
| 4,995,989 A * | 2/1991 | Carroll et al. | 210/788 |
| 5,310,478 A | 5/1994 | McCants | |
| 6,092,599 A * | 7/2000 | Berry et al. | 166/265 |

(Continued)

FOREIGN PATENT DOCUMENTS

| | | |
|---|---|---|
| GB | 2377711 A | 1/2003 |
| WO | WO 98/12239 | 3/1998 |

(Continued)

*Primary Examiner* — David C Mellon
(74) *Attorney, Agent, or Firm* — Knobbe Martens Olson & Bear LLP

(57) ABSTRACT

A system for the production or handling of heavy oil comprises means (18) for introducing an immiscible viscosity-reducing fluid into the heavy oil at an upstream end of a flow line (10,22) to create a dispersion of oil and viscosity-reducing fluid, and means (24,30) for separating the viscosity-reducing fluid at least partially from the oil at a downstream end of the flow line. The separating means comprises a cyclonic fluid conditioning unit (24) connected receive the dispersion of oil and viscosity-reducing fluid from the downstream end of the flow line (22), said cyclonic fluid conditioning unit being constructed and arranged to subject the dispersion to a cyclonic conditioning process; and a gravity separator unit (30) connected to receive the conditioned dispersion from the cyclonic fluid conditioning unit. The gravity separator unit (30) is constructed and arranged to allow at least partial separation of the viscosity-reducing fluid from the oil and has a first outlet for the separated viscosity-reducing fluid and a second outlet for the separated oil.

20 Claims, 3 Drawing Sheets

(56) References Cited

U.S. PATENT DOCUMENTS

| | | |
|---|---|---|
| 6,197,095 B1 | 3/2001 | Ditria et al. |
| 6,398,973 B1 | 6/2002 | Saunders et al. |
| 7,314,559 B2 * | 1/2008 | Hopper .................. 210/512.1 |

FOREIGN PATENT DOCUMENTS

| | | |
|---|---|---|
| WO | WO 01/59257 A | 8/2001 |
| WO | WO 03/083259 A2 | 10/2003 |
| WO | WO 03/102052 A1 | 12/2003 |

* cited by examiner

SYSTEM AND METHOD FOR THE PRODUCTION OR HANDLING OF HEAVY OIL

This application is the U.S. National Phase filing under 35 U.S.C. §371 of PCT/GB2005/001940, filed May 16, 2005, which designated the United States and was published in English, which claims priority under 35 U.S.C. §119(a)-(d) to Great Britain Patent Application No. 0410961.7, filed May 17, 2004, the entire contents of which are incorporated herein by reference.

The present invention relates to a system and a method for the production or handling of heavy oil, and to a system and method for separating a dispersion of two immiscible fluids.

The production of heavy oil from oil producing wells is often significantly restricted because of the high viscosity of produced fluids. The viscosity of oil that is generally categorised as heavy typically ranges between a few tens and several thousand centipoises (cp) at the operating pressure and temperature. The high density and viscosity of the heavy oil causes significant losses through the well bore and in some cases, it reaches a level that production ceases completely.

The oil industry has tried to overcome this problem in a number of ways in the past. The methods used include steam drive and steam injection, the use of downhole electrical submersible pumps (ESPs) and heating the produced oil. These techniques work successfully to a degree but in all cases involve high capital expenditure together with high operation and maintenance costs.

A further solution which has also worked successfully in the past involves the use of eductors or jet pumps downhole, to add a diluent fluid such as naphtha to the motive flow. The eductor in this case performs two useful functions—one is to reduce the back pressure on the production zone, and the second is to mix the diluent with the produced oil and thereby significantly reduce its viscosity. The effect of the drop in the viscosity of the mixture is quite significant as it reduces the loss of pressure through the well bore, thus reducing the resistance to flow and increasing production.

Most diluents such as naphtha have a number of drawbacks despite their advantages. The drawbacks are as follows:
1. The diluent is dissolved in the heavy oil and cannot be separated downstream: therefore the expensive diluents cannot be re-used.
2. The amount of diluent that has to be added is significant and could vary between 20% and 60% of total produced oil, depending on the type of oil and the operating conditions. Therefore the inability to recover the diluent downstream of the production system is a major drawback and a cost burden to operators. Ideally, any additives that are injected or added to the heavy oil should be small in quantity and also removable wholly or in part downstream of the production system for re-use, so that the cost burdens of the operator are minimised.

An additive in the form of an environmentally-friendly water-based gel has been developed, which can be used in small quantities and provides the same duties as other diluents in reducing the apparent viscosity of the heavy oil. This additive is the subject of international patent applications WO9812239, WO03083259 and WO03102052, the contents of which are included by reference herein. The gel is mixed with water to form a viscosity-reducing fluid that is immiscible in oil and can therefore be separated from the oil after use. However, separation takes a very long time, which reduces the practical value of the additive.

It is an object of the present invention to provide a system and a method for boosting production and improving handling of heavy oil, which mitigates at least some of the aforesaid disadvantages.

According to the present invention there is provided a system for the production or handling of heavy oil, the system comprising means for introducing an immiscible viscosity-reducing fluid into the heavy oil at an upstream end of a flow line to create a dispersion of oil and viscosity-reducing fluid, and means for separating the viscosity-reducing fluid at least partially from the oil at a downstream end of the flow line, said separating means comprising a cyclonic fluid conditioning unit connected to receive the dispersion of oil and viscosity-reducing fluid from the downstream end of the flow line, said cyclonic fluid conditioning unit being constructed and arranged to subject the dispersion to a cyclonic conditioning process, and a gravity separator unit connected to receive the conditioned dispersion from the cyclonic fluid conditioning unit, said gravity separator unit being constructed and arranged to allow at least partial separation of the viscosity-reducing fluid from the oil and having a first outlet for the separated viscosity-reducing fluid and a second outlet for the separated oil.

The reduction in viscosity achieved by introduction of the fluid makes transportation of the heavy oil through a pipeline much easier. This can therefore improve both production and handling of the heavy oil. The system subsequently extracts the viscosity-reducing fluid from the oil, allowing it to be reused. This therefore reduces the costs for the operator. The extraction system operates quickly and efficiently, making use of the system feasible even for large quantities of oil.

Advantageously, the means for introducing an immiscible viscosity-reducing fluid into the heavy oil comprises a pump having inlets for the heavy oil and for the viscosity-reducing fluid, and an outlet for the dispersion of oil and viscosity-reducing fluid. The pump is preferably a jet pump having a low pressure inlet for the heavy oil, a high pressure inlet for the viscosity-reducing fluid, and a high pressure outlet for the dispersion of oil and viscosity-reducing fluid. Use of a jet pump ensures the production of a fine dispersion of the viscosity-reducing fluid in the heavy oil, which provides maximum benefit in the reduction of viscosity. The pump also boosts the flow of oil along the flow line. Other kinds of pump may also be used.

Advantageously, the flow line includes a production well, and the means for introducing an immiscible viscosity-reducing fluid into the heavy oil is located towards the lower end of the production well. This boosts production from the well.

Advantageously, the cyclonic fluid conditioning unit is constructed and arranged to subject the dispersion to a centrifugal acceleration in the range 500 g to 5000 g, typically about 3000 g.

The cyclonic fluid conditioning unit is preferably a uniaxial involute conditioning unit, where the spinning of the dispersion is generated by an involute or similar tangential entry device. Other types of cyclonic fluid conditioning unit may also be used. The cyclonic fluid conditioning unit may include an axial gas outlet.

The gravity separator unit preferably comprises a horizontal separator unit, which preferably has a length to width ration of between 5:1 and 100:1. The separator may consist of a length of pipeline.

The system preferably includes a return line for returning the separated viscosity-reducing fluid to the means for introducing the viscosity-reducing fluid into the heavy oil. This allows the viscosity-reducing fluid to be reused, so reducing costs for the operator. The return line preferably includes a pump for boosting the pressure of the viscosity-reducing fluid. The return line may include an inlet for adding more viscosity-reducing fluid.

The viscosity-reducing fluid preferably comprises a water-based gel. The dispersion preferably includes the viscosity-reducing fluid in a proportion of 25-60% by weight.

According to another aspect of the invention there is provided a system for separating a dispersion of two immiscible fluids, the system comprising a cyclonic fluid conditioning unit that is constructed and arranged to subject the dispersion to a cyclonic conditioning process, and a gravity separator unit connected to receive the conditioned dispersion from the cyclonic fluid conditioning unit, said gravity separator unit being constructed and arranged to allow at least partial separation of the fluids and having a first outlet for a first immiscible fluid and a second outlet for a second immiscible fluid.

Advantageously, the cyclonic fluid conditioning unit is constructed and arranged to subject the dispersion to a centrifugal acceleration in the range 500 g to 5000 g.

The cyclonic fluid conditioning unit may be a uniaxial involute separator.

Advantageously, the gravity separator unit comprises a horizontal separator unit.

According to another aspect of the invention there is provided a method for the production or handling of heavy oil, the method comprising introducing an immiscible viscosity-reducing fluid into the heavy oil at an upstream end of a flow line to create a dispersion of oil and viscosity-reducing fluid, and separating the viscosity-reducing fluid at least partially from the oil at a downstream end of the flow line, said separating step comprising subjecting the dispersion to a cyclonic conditioning process, and subsequently allowing at least partial gravitational separation of the viscosity-reducing fluid from the oil.

Advantageously, the immiscible viscosity-reducing fluid is introduced into the heavy oil using a pump having inlets for the heavy oil and for the viscosity-reducing fluid, and an outlet for the dispersion of oil and viscosity-reducing fluid.

The pump is preferably a jet pump having a low pressure inlet for the heavy oil, a high pressure inlet for the viscosity-reducing fluid, and a high pressure outlet for the dispersion of oil and viscosity-reducing fluid.

Advantageously, the immiscible viscosity-reducing fluid is introduced into the heavy oil towards the lower end of a production well.

The dispersion is preferably subjected to a centrifugal acceleration in the range 500 g to 5000 g.

Advantageously, the dispersion is conditioned in a uniaxial involute conditioning unit.

Advantageously, the conditioned dispersion is separated in a horizontal separator unit.

Advantageously, the separated viscosity-reducing fluid is returned for re-introduction into the heavy oil.

The pressure of the returned viscosity-reducing fluid is preferably boosted prior to re-introduction.

The viscosity-reducing fluid preferably comprises a water-based gel.

The dispersion preferably includes the viscosity-reducing fluid in a proportion of 25-60% by weight.

According to another aspect of the invention there is provided a method of separating two immiscible fluids, the method comprising subjecting the dispersion to a cyclonic conditioning process, and allowing at least partial gravitational separation of the fluids in the conditioned dispersion.

Advantageously, the conditioning step includes subjecting the dispersion to a centrifugal acceleration in the range 500 g to 5000 g.

This patent application relates generally to a system for applying the gel-water mixture in an effective way, conditioning the resulting dispersion and separating it for re-use downstream of the transport or process system. Some important features of the system are described in the following sections.

Use of a downhole liquid-liquid jet pump for boosting production and also use of diluents such as naphtha as part of the feed to the jet pump are both known technologies and are not the subject of this patent application. Those operations are, however, highlighted as a pre-cursor to the downstream fluid conditioning, separation and handling system which is the subject of this patent application. The thorough dispersal of the viscosity-reducing fluid with the heavy viscous crude oil as it passes through a jet pump or electrical submersible pump and other equipment within the flow path such as choke valves, valves, pipework, pipe bends, tee-junctions an so on may cause some shearing of the mixture and the creation of fine droplets, which are difficult to separate when needed. The dispersion may in fact reach a state of stable or semi stable emulsion which may need several hours to separate under normal gravity separation when the phase separation is needed downstream.

Use of gravity separators to separate the viscosity-reducing fluid from the oil is not cost effective because of the long residence time needed to separate the two fluids. This residence time could be in some cases several minutes to hours. The use of cyclonic devices alone which generate high "g" forces to effect efficient separation has also proved problematic. The main reason is that the cyclonic devices also generate a severe shearing effect on the dispersion and thus prevents the efficient separation of the fluids. The cyclonic device cannot therefore produce the required separation of the two fluids on its own. The present invention provides a new solution that has proved to be successful.

The proposed solution for separating the fluids consists essentially of two parts in series:

stage 1: an upstream compact cyclonic device which by imparting a high degree of spin and shearing generates a conditioned dispersion with unique properties that behaves counter to that normally expected, and stage 2: a downstream gravity separator, handling the conditioned dispersion, having a new form that is different from a simple dispersion of gel-water droplets in the oil matrix.

The conditioned dispersion, as a result of the cyclonic device shearing the fluids, now consists of droplets of both oil and gel-water combined and rolling over one another with reduced friction between the droplets. In this state, separation of droplets of different density becomes significantly easier compared to the dispersion before being subjected to cyclonic forces and shear. The gravity separation system enables an efficient separation of the two fluids (the oil and the and gel-water mixture), by use of simple residence time and without further agitation and shearing of the fluids.

The gravity separation system could be of a variety of types, including a storage tank or a pipeline type where the fluids are stored for a limited time to effect separation. The separation by gravity is in this case speeded up and becomes efficient mainly because of the changes in the nature of the dispersion and the major coalescence of fine droplets generated as a result of stage 1 and also because the stage 2 operation does not involve any undesired agitation, mixing or shearing of the dispersion which have adverse effect on separation.

The stage 1 cyclonic device may also be located inside the stage 2 gravity separator, for example as an inlet device to the gravity separator.

This solution applies to gel water mixtures which when mixed with heavy oil are not fully dispersed in oil phase, but their presence in the oil phase in the form of droplets helps to reduce the apparent viscosity of heavy oil.

The gel-water mixture which is fully or partially separated in the gravity separator (stage 2) can then be re-used and pumped downhole as the motive flow to the downhole jet pump.

The gel-water mixture can be also injected into produced heavy oil at the surface (wellhead) using a jet pump or such similar mixing or pumping device. This solution or process will be helpful when downhole injection is not feasible because of the features of the well but a reduction of viscosity to reduce losses along the surface transportation pipelines is highly desirable and beneficial.

Some preferred features and advantages of the invention are as follows:

a process and a system by which high "g" forces and high shearing of fluids are generated in oil/gel-water dispersion for conditioning the dispersion which will result in better separation of oil and gel-water;

a process and a system as described above where the compact separator used to generate high "g" forces and high shearing is a uniaxial type involute separator, where the spinning of the dispersion is generated by an involute or similar tangential entry device;

a process and a system as above where the high "g" forces and high shearing of fluids is carried out by any other cyclonic device to achieve fluid conditioning which facilitates speedy separation of heavy oil from gel-water mixture;

a system where two stages of treatments in series are involved, wherein the first stage is a fluid conditioning stage using a cyclonic/fluid shearing device; and the second stage involves use of a gravity separator to allow water/gel and oil phase separation;

a system where the separated gel/water mixture is, pumped to the oil well as feed to the downhole or surface mounted jet pump;

a downhole or surface mounted jet pump system which receives the separated HP gel/water as motive flow and mixes it with heavy oil and delivers it to the outlet tube for more effective transport; and a cyclonic device upstream of a gravity separator that may also be located within the gravity separator as an inlet fluid conditioning device for effective fluid separation.

An embodiment of the invention will now be described by way of example with reference to the accompanying drawing, in which.

Figure 1:
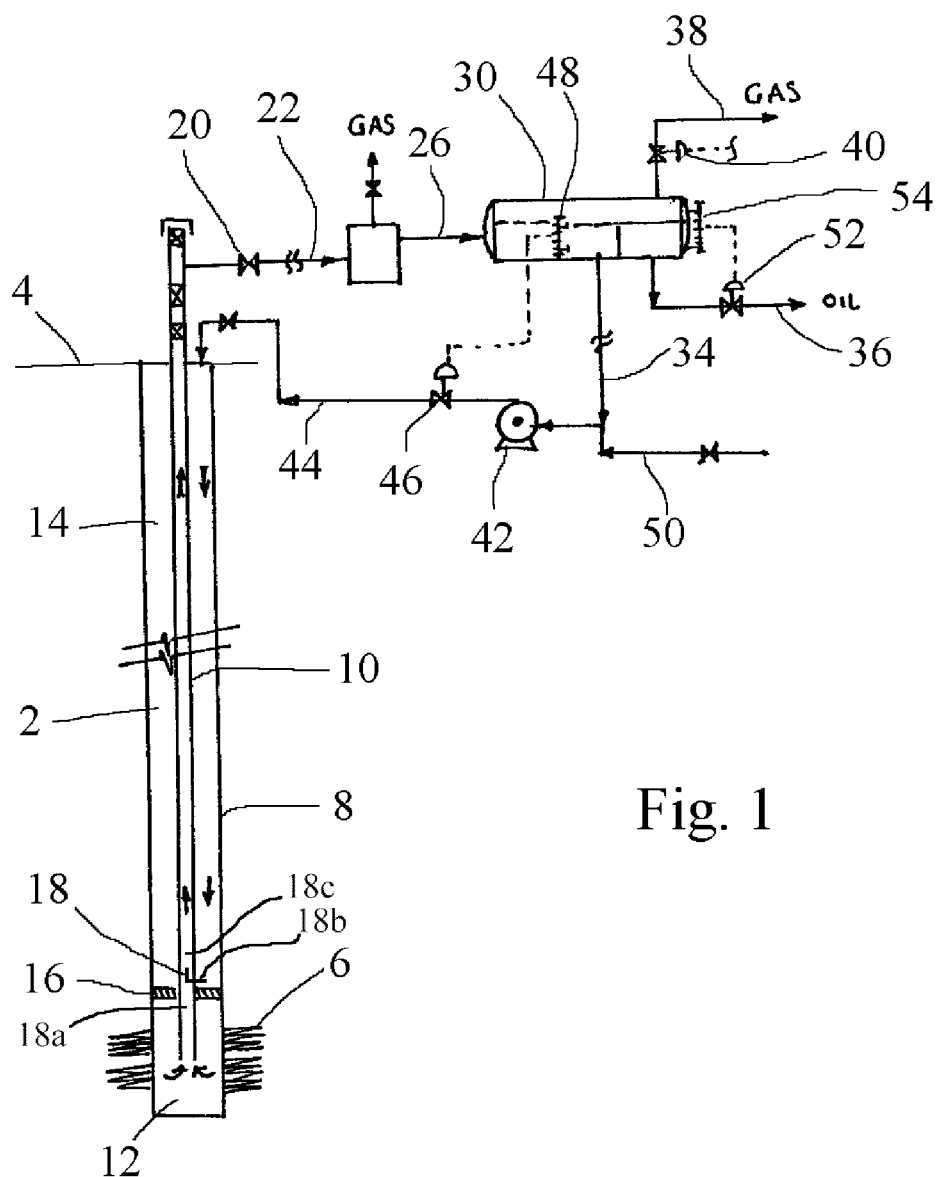
FIG. 1 shows a system for boosting production of heavy oil from an oil well.

FIG. 1 shows a system for boosting the production of heavy oil from an oil production well 2. The production well 2 extends from a surface level 4 down to a production zone 6, and includes an outer casing 8 and a central tubing 10. The lowermost part 12 of the well is separated from the upper part 14 by a packer 16, which fills the annular gap between the casing 8 and the tubing 10. Oil entering the lowermost part 12 of the well therefore flows upwards through the tubing 10. This situation can however be reversed, so that produced oil flows upwards through the annular spacing between the casing 8 and the tubing 10.

Production of oil from the well is boosted by a liquid-liquid jet pump 18 (or eductor), which is mounted in the lower part of the tubing 10, just above the packer 16. The jet pump 18 has a low pressure inlet 18a for produced oil, which is connected to the lower end of the tubing 10, a high pressure inlet 18b for motive flow, which receives a driving fluid pumped into the annular gap between the tubing 10 and the case 8, and a high pressure outlet 18c for the combined flow of produced oil and the driving fluid, which is connected to the upper part of the tubing 10. The driving fluid in this case is an immiscible viscosity-reducing fluid, for example of the general types described in WO9812239, WO03083259 and WO03102052. Therefore, as well as increasing the pressure of the produced oil, the fluid also reduces the viscosity of the oil, thereby increasing the production of oil from the well.

The upper part of the well is connected via a control valve 20 and a pipeline 22 to a cyclonic conditioning unit 24. A number of control valves 26 may also be provided in the upper part of the tubing 10. The length of the pipeline 22 may be anything from a few metres to several kilometres, the flow of oil along the pipeline being boosted by the action of the jet pump 18 and the velocity-reducing fluid.

The cyclonic fluid conditioning unit 24, which is described in further detail below, includes a fluid inlet that is connected to receive the dispersion of heavy oil and viscosity-reducing fluid from the pipeline 22, a liquid outlet that is connected to a pipeline 26 and optionally a gas outlet through which entrained gas can be vented from the system, through a valve 28. As the dispersion of oil and viscosity-reducing fluid passes through the cyclonic conditioning unit 24 it is caused to swirl in a vortex, thereby subjecting the dispersion of fluids to a high centrifugal acceleration, for example in the range 500 g-5000 g (where g=9.8 m/s$^2$). This conditions the dispersion of fluids and aids subsequent separation of the viscosity-reducing fluid from the heavy oil. Separation does not however take place within the fluid conditioning unit: the dispersion of oil and viscosity-reducing fluid leaves the conditioning unit through a single fluid outlet.

The conditioned fluids pass from the pipeline 26 into the inlet of a conventional horizontal gravity separator 30. The separator 30 typically has a length of from 3-30 metres and a length to diameter ratio of between 5:1 and 100:1. The separator 30 is divided horizontally by a weir 32 and includes a first outlet on the upstream side of the weir that is connected to a line 34 for the viscosity-reducing fluids, and a second outlet on the downstream side of the weir, which is connected to a line 36 for the oil. As the conditioned dispersion of oil and viscosity-reducing fluid enters the separator, the fluids rapidly separate into two layers with the oil floating on top of the viscosity-reducing fluid. The oil flows over the weir 32 into the downstream part of the separator then exits through the oil outlet into the oil line 36. The viscosity-reducing fluid is trapped on the upstream side of the weir 32 and exists through the line 34. The separator also includes a gas outlet, which is connected to a vent line 38 via a control valve 40.

The separated viscosity-reducing fluid passes from line 34 into the inlet of a pump 42, and then passes from the pump outlet via a feed line 44 back to the well, where it is pumped back down the annular gap between the casing 8 and the tubing 10 to drive the jet pump 18. The rate of flow of the viscosity-reducing fluid is controlled automatically by a control valve 46 in the feed line 44, which is operated according to signals received from a level sensor 48 in the separator 30, so as to maintain the correct level of fluid in the separator (i.e. with the interface between the oil and the viscosity-reducing fluid just below the top weir 32. Additional viscosity-reducing fluid may be added at the pump inlet, through a supply line 50.

The rate of flow of oil through the oil outlet line 36 is controlled by a second control valve 52, which is connected to receive a control signal from a second level sensor 54 at the downstream end of the separator 30.

Figure 2:
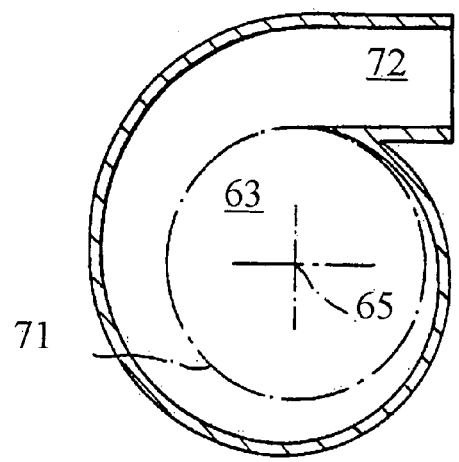
FIG. 2 is a first cross-section through a cyclonic fluid conditioning unit, on line 2-2 of FIG. 4.
Figure 3:
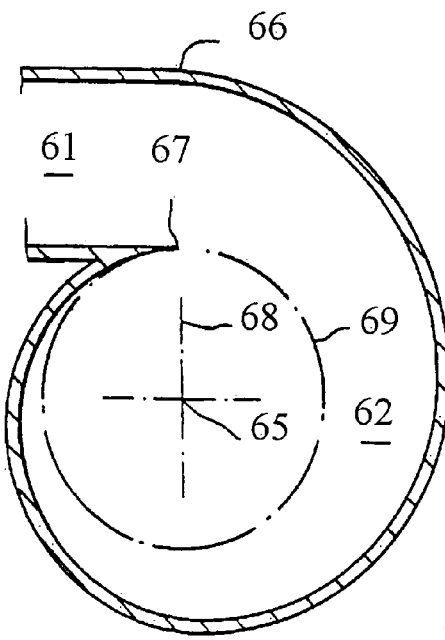
FIG. 3 is a second cross-section through the cyclonic fluid conditioning unit, on line 3-3 of FIG. 4.
Figure 4:
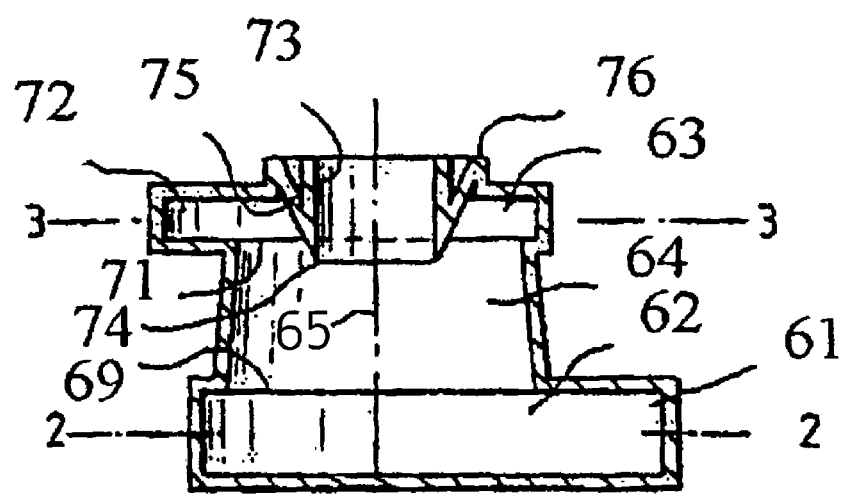
FIG. 4 is a side section through the cyclonic fluid conditioning unit.

The cyclonic conditioning unit 24 may be of an involute type, for example as shown in FIGS. 2-4. This conditioning unit 24 includes an inlet conduit 61, which has involute shaped inlet and outlet chambers 62, 63 with an intermediate chamber 64 which joins the inlet and outlet chambers along the common axis 65 of the three chambers.

As can be seen from FIG. 3, the curved wall of the inlet chamber 62 decreases from a maximum radius at 66 to a minimum radius at 67 as it subtends the full 360 degrees around the axis 65. The downstream end of the inlet conduit 61 is defined on the outside 66 by the curved wall of maximum radius and on the inside 67 by the curved wall of minimum radius. For ease of manufacture, the radius decreases gradually, the curved wall having at least three, and in this embodiment four, sections of constant radius and subtending equal angles (90 degrees) at their respective centres, adjacent sections being centred about points on the common normal to the adjacent ends of those portions (thus making those common ends tangential), the radii of successive sections increasing from the minimum to the maximum. In this embodiment, the innermost section of the involute is centred on the normal 68 which passes through the axis 65. The radius of the inlet end 69 of the intermediate chamber 64 is not greater than the minimum radius of the inlet involute and in this embodiment is smaller than the smallest of the four radii.

The intermediate chamber 64 is frusto-conical, tapering inwardly to a smaller radius at its outlet end 71 which is not greater than and in this embodiment is smaller than the minimum radius of the outlet involute. The radius of the intermediate chamber 64 is of course smaller than the minimum radius of the inlet involute. As shown in FIG. 2, the curved wall of the outlet involute gradually increases in radius in subtending the full 360 degrees leading to a tangential outlet conduit 72 in the opposite manner to that described for the inlet involute, the involutes being arranged to receive fluids swirling in the same sense about the stage axis 65 as the swirl induced in the inlet involute. There is an axial outlet from the second stage comprising a co-axial inner cylinder 73 extending through the outlet chamber and protruding at 74 slightly into the intermediate chamber 64. A frusto-conical wall 75 surrounds the inner cylinder, tapering outwards from the entry of the axial outlet to the far end 76 of the outlet involute.

The fluid dispersion flowing into the inlet conduit 61 of the second stage follows the increasing curvature of the curved wall of the inlet involute and so swirls around the axis 65 with increasing velocity. As the swirling dispersion travels along the axis 65, the liquid phases (the oil and the viscosity-reducing fluid) tend to move to the outer radii and any lighter gas phase tends to move towards the axis of the stage. The velocity of swirl is increased by the small entry radius of the intermediate chamber and further by its taper. The lighter gas phase near the axis will therefore leave the intermediate chamber through the axial outlet cylinder 73, whereas the liquid phases at greater radii will be urged by the tapered shield 75 into the outlet involute around the curved wall of which they will swirl towards the tangential outlet conduit 72. The liquid phases are conditioned by the high centrifugal forces experienced within the conditioning unit 24, which aids subsequent separation of those fluids in the horizontal gravity separator 30.

If a gas outlet is not required, one of the outlets may be closed, so that all the fluid entering the cyclonic fluid conditioning unit 24 leaves through a single outlet conduit. This outlet conduit may be either the tangential outlet conduit 72 or the axial outlet cylinder 73. In either case, operation of the cyclonic fluid conditioning unit is as described above, the liquid phases being conditioned by the high centrifugal forces experienced within the conditioning unit 24.

The complete separation and boosting system may therefore comprise the following stages, as shown in FIG. 1:
- a compact cyclonic device to condition the dispersion of oil and gel/water viscosity-reducing fluid;
- a gravity separator which separates the bulk of the viscosity-reducing fluid from the dispersion for re-injection;
- a pump for supplying the viscosity-reducing fluid under pressure to a downhole jet pump, and
- a downhole jet pump, which receives the pressurised viscosity-reducing fluid as the motive flow and mixes it with the produced heavy oil to reduce heavy oil's apparent viscosity and facilitate transportation.

The viscosity-reducing fluid in the form of a gel-water mixture is added to the motive, high pressure (HP) fluid, which is injected into the well via the tubing or tubing annulus within the well bore. The downhole jet pump receives the motive flow through its nozzle and disperses it into the produced heavy oil. At the outlet of the jet pump the heavy oil/viscosity-reducing fluid dispersion is transported to surface via the tubing or the annulus. This dispersion flows with a significant reduction in the pressure loss through its flow path because of the major drop in its apparent viscosity. The produced dispersion at the wellhead can therefore also flow far more efficiently through the remaining transportation pipeline to the process and handling system with a further reduction in the loss of pressure through the pipeline because of the said reduction in viscosity. The oil/viscosity-reducing fluid dispersion at this stage is not easy to separate. This is because of the nature of the dispersion with fine droplets of gel-water dispersed in the oil phase. This relatively stable dispersion has the benefit of keeping the apparent viscosity of the oil down and the two fluids do not separate significantly along the transport lines, thus maintaining its useful function.

The invention claimed is:

1. A system for the production or handling of heavy oil, the system comprising a supply of heavy oil, a viscosity-reducing fluid comprising a water-based gel that is immiscible in oil, means for introducing an immiscible viscosity-reducing fluid into the heavy oil at an upstream end of a flow line to create a dispersion of oil and viscosity-reducing fluid, and means for separating the viscosity-reducing fluid at least partially from the oil at a downstream end of the flow line, said separating means comprising a uniaxial involute fluid conditioning unit that is connected to receive the dispersion of oil and viscosity-reducing fluid from the downstream end of the flow line, said uniaxial involute fluid conditioning unit comprising an involute inlet chamber, an intermediate chamber and an involute outlet chamber with a fluid outlet, wherein the uniaxial involute fluid conditioning unit subjects the dispersion to a cyclonic conditioning process without separating the dispersion to form a conditioned dispersion, and the conditioned dispersion then leaves the uniaxial involute fluid conditioning unit through the fluid outlet, and a gravity separator unit connected to receive the conditioned dispersion from the fluid outlet of the uniaxial involute fluid conditioning unit, wherein said gravity separator unit allows at least partial separation of the viscosity-reducing fluid from the oil and having a first outlet for the separated viscosity-reducing fluid and a second outlet for the separated oil.

2. The system according to claim 1, wherein the means for introducing an immiscible viscosity-reducing fluid into the heavy oil comprises a pump having inlets for the heavy oil and for the viscosity-reducing fluid, and an outlet for the dispersion of oil and viscosity-reducing fluid.

3. The system according to claim 2, wherein the pump is a jet pump having a low pressure inlet for the heavy oil, a high pressure inlet for the viscosity-reducing fluid, and a high pressure outlet for the dispersion of oil and viscosity-reducing fluid.

4. The system according to claim 1 wherein the flow line includes a production well, and the means for introducing an immiscible viscosity-reducing fluid into the heavy oil is located towards the lower end of the production well.

5. The system according to claim 1, wherein the uniaxial involute fluid conditioning unit is constructed and arranged to subject the dispersion to a centrifugal acceleration between 500g and 5000g.

6. The system according to claim 1, wherein the uniaxial involute fluid conditioning unit includes an axial gas outlet.

7. The system according claim 1, wherein the gravity separator unit comprises a horizontal separator unit.

8. The system according to claim 1, further comprising a return line for returning the separated viscosity-reducing fluid to the means for introducing the viscosity-reducing fluid into the heavy oil.

9. The system according to claim 8, wherein the return line includes a pump for boosting the pressure of the viscosity-reducing fluid.

10. The system according to claim 8, wherein the return line includes an inlet for adding more viscosity-reducing fluid.

11. The system according to claim 1, wherein the dispersion includes the viscosity-reducing fluid in a proportion of 25-60% by weight.

12. A method for the production or handling of heavy oil, the method comprising introducing an immiscible viscosity-reducing fluid comprising a water-based gel that is immiscible in the oil into the heavy oil at an upstream end of a flow line to create a dispersion of oil and viscosity-reducing fluid, and separating the viscosity-reducing fluid at least partially from the oil at a downstream end of the flow line using a uniaxial involute fluid conditioning unit that is connected to receive the dispersion of oil and viscosity-reducing fluid, said uniaxial involute fluid conditioning unit comprising an involute inlet chamber, an intermediate chamber and an involute chamber with a fluid outlet, wherein the uniaxial involute fluid conditioning unit subjects the dispersion to a cyclonic conditioning process without separating the dispersion to form a conditioned dispersion, and the conditioned dispersion then leaves the uniaxial fluid conditioning unit through the fluid outlet, and a gravity separator unit having a first outlet for the separated viscosity-reducing fluid and a second outlet for the separated oil, wherein the gravity separator unit receives the conditioned dispersion from the fluid outlet of the uniaxial involute fluid conditioning unit, and subsequently separating the viscosity-reducing fluid at least partially from the oil by gravitational separation.

13. The method according to claim 12, wherein the immiscible viscosity-reducing fluid is introduced into the heavy oil using a pump having inlets for the heavy oil and for the viscosity-reducing fluid, and an outlet for the dispersion of oil and viscosity-reducing fluid.

14. The method according to claim 13, wherein the pump is a jet pump having a low pressure inlet for the heavy oil, a high pressure inlet for the viscosity-reducing fluid, and a high pressure outlet for the dispersion of oil and viscosity-reducing fluid.

15. The method according to claim 12, wherein the immiscible viscosity-reducing fluid is introduced into the heavy oil towards the lower end of a production well.

16. The method according to claim 12, wherein the dispersion is subjected to a centrifugal acceleration between 500g and 5000g.

17. The method according to claim 12, wherein the gravity separator unit comprises a horizontal separator unit.

18. The method according to claim 12, wherein the separated viscosity-reducing fluid is returned for re-introduction into the heavy oil.

19. The method according to claim 18, wherein the pressure of the returned viscosity-reducing fluid is boosted prior to re-introduction.

20. The method according to claim 12, wherein the dispersion includes the viscosity-reducing fluid in a proportion of 25-60% by weight.

* * * * *